United States Patent
Gustav et al.

(10) Patent No.: US 10,178,870 B2
(45) Date of Patent: Jan. 15, 2019

(54) METHOD FOR MANUFACTURING AN AERATED CONFECTIONERY SHELL

(75) Inventors: Thorsten Gustav, Solihull (GB); Paula Mora Castrillon, Munich (DE); Rudolph Hauger, Rheinfelden (DE)

(73) Assignee: Kraft Foods R&D, Inc., Deerfield, IL (US)

(*) Notice: Subject to any disclaimer, the term of this patent is extended or adjusted under 35 U.S.C. 154(b) by 726 days.

(21) Appl. No.: 14/131,195

(22) PCT Filed: Jun. 29, 2012

(86) PCT No.: PCT/US2012/044857
§ 371 (c)(1),
(2), (4) Date: Apr. 28, 2014

(87) PCT Pub. No.: WO2013/006412
PCT Pub. Date: Jan. 10, 2013

(65) Prior Publication Data
US 2014/0234523 A1    Aug. 21, 2014

(30) Foreign Application Priority Data
Jul. 6, 2011  (EP) .................................. 11172834

(51) Int. Cl.
*A23G 3/52*    (2006.01)
*A23G 1/52*    (2006.01)
(Continued)

(52) U.S. Cl.
CPC ........... *A23G 1/0073* (2013.01); *A23G 1/003* (2013.01); *A23G 1/0076* (2013.01); *A23G 1/52* (2013.01); *A23G 3/0082* (2013.01); *A23G 3/52* (2013.01)

(58) Field of Classification Search
CPC .......... A23G 1/00; A23G 1/0076; A23G 1/30; A23G 1/36; A23G 3/008; A23G 3/0029;
(Continued)

(56) References Cited

U.S. PATENT DOCUMENTS

| 1,647,944 A | 11/1927 | Villasenor |
| 1,775,549 A | 9/1930 | Birdseye |

(Continued)

FOREIGN PATENT DOCUMENTS

| AU | 199957075 | 5/2000 |
| BE | 1017445 | 9/2008 |

(Continued)

OTHER PUBLICATIONS

Australian Patent Office, Office Action dated Jul. 2, 2014, from Australian Patent Application No. 2012279251, 3 pages.
(Continued)

*Primary Examiner* — Jyoti Chawla
(74) *Attorney, Agent, or Firm* — Fitch, Even, Tabin & Flannery LLP

(57) ABSTRACT

The present invention provides a method for manufacturing an aerated confectionery shell comprising the steps of: (i) aerating an edible liquid; (ii) depositing the aerated edible liquid into a mould cavity; and (iii) pressing the aerated edible liquid in the mould cavity using a stamp having a surface temperature below the solidification temperature of the edible liquid so as to shape and at least partially solidify the liquid, thereby forming an aerated shell layer; wherein the aerated shell layer has a total gas content of at least 5%, the gas content being calculated using the following formula (1): Gas content of aerated shell layer=(M2−M1)/M2 Wherein M1 is the mass of the aerated shell layer having volume V1, and M2 is the mass of a non-aerated shell layer having volume V1 and being formed from the same edible (Continued)

liquid as the aerated shell layer and in the same manner as the aerated shell layer. An aerated confectionery shell obtainable by this method is also provided.

20 Claims, 2 Drawing Sheets

(51) Int. Cl.
*A23G 1/00* (2006.01)
*A23G 3/34* (2006.01)

(58) Field of Classification Search
CPC ...... A23G 3/54; A23G 3/0065; A23G 3/0068; A23G 3/0252; A23G 3/545; A23G 4/10; A23G 4/20; A23G 2200/12; A23G 2220/20; A23G 1/003; A23G 1/0073; A23G 1/52; A23G 3/52; A23G 3/0082
USPC .......................... 426/103, 138, 302, 660, 631
See application file for complete search history.

(56) References Cited

U.S. PATENT DOCUMENTS

| | | | |
|---|---|---|---|
| 2,671,417 A | 3/1954 | Jacobsen | |
| 2,796,033 A | 6/1957 | Feinstein | |
| 3,027,728 A | 4/1962 | Greer | |
| 3,233,562 A | 2/1966 | Nakamura | |
| 3,798,337 A | 3/1974 | Abalo | |
| 4,081,559 A * | 3/1978 | Jeffery | A23G 1/32 426/103 |
| 4,104,411 A | 8/1978 | Pooler | |
| 4,426,402 A * | 1/1984 | Kaupert | A23G 1/205 425/547 |
| 4,501,544 A | 2/1985 | Akutagawa | |
| 5,238,698 A | 8/1993 | Zumbe et al. | |
| 5,360,116 A | 11/1994 | Schmiletzky | |
| 5,360,166 A | 11/1994 | Nogi | |
| 5,500,178 A | 3/1996 | Hayashi | |
| 5,705,217 A | 1/1998 | Aasted | |
| 5,789,005 A | 8/1998 | Tabaroni | |
| 5,832,697 A | 11/1998 | Rogers | |
| 6,165,531 A | 12/2000 | Harding | |
| 6,180,158 B1 * | 1/2001 | Zietlow | A23G 3/0221 426/470 |
| 6,217,927 B1 | 4/2001 | Suttle | |
| 6,242,028 B1 | 6/2001 | Bean | |
| 6,406,732 B1 | 6/2002 | Lee | |
| 6,419,970 B1 | 7/2002 | Willcocks | |
| 2003/0090026 A1 | 5/2003 | Rasmussen | |
| 2004/0131751 A1* | 7/2004 | Dekker | A23G 3/0027 426/660 |
| 2005/0175737 A1 | 8/2005 | Knobel | |
| 2006/0057265 A1 | 3/2006 | Knobel | |
| 2006/0257517 A1 | 11/2006 | Steiner | |
| 2009/0274803 A1 | 11/2009 | Descamps | |
| 2012/0183650 A1 | 7/2012 | Liske | |
| 2014/0220229 A1 | 8/2014 | Gustav | |
| 2014/0234523 A1 | 8/2014 | Gustav | |
| 2014/0287102 A1 | 9/2014 | Gustav | |
| 2014/0328986 A1 | 11/2014 | Weers | |

FOREIGN PATENT DOCUMENTS

| | | | |
|---|---|---|---|
| BR | 9301046 | 8/1994 | |
| CH | 680411 | 8/1992 | |
| CN | 1083666 | 3/1994 | |
| CN | 1129393 | 8/1996 | |
| CN | 1431868 | 7/2003 | |
| CN | 1652691 | 8/2005 | |
| DE | 2812269 | 10/1978 | |
| DE | 142986 | 7/1980 | |
| DE | 29808288 | 9/1999 | |
| DE | 19830258 | 1/2000 | |
| DE | 19851063 | 5/2000 | |
| DE | 19853847 | 5/2000 | |
| DE | 102005018415 | 11/2006 | |
| DE | 102008019038 | 2/2010 | |
| EP | 0230763 | 8/1987 | |
| EP | 0589820 | 3/1994 | |
| EP | 0730827 | 9/1996 | |
| EP | 0914774 | 5/1999 | |
| EP | 0945069 | 9/1999 | |
| EP | 1103467 | 5/2001 | |
| EP | 1346641 | 9/2003 | |
| EP | 1413205 | 4/2004 | |
| EP | 1509092 | 3/2005 | |
| EP | 1604573 | 12/2005 | |
| EP | 2018811 | 1/2009 | |
| EP | 2386208 | 11/2011 | |
| FR | 1587835 | 3/1970 | |
| FR | 2539670 | 7/1984 | |
| FR | 2609237 | 7/1988 | |
| FR | 2801570 | 6/2001 | |
| GB | 459583 | 1/1937 | |
| GB | 645747 | 11/1950 | |
| GB | 769092 | 2/1957 | |
| GB | 1128525 | 9/1968 | |
| GB | 1214983 | 12/1970 | |
| GB | 1305520 | 2/1973 | |
| GB | 2140737 | 12/1984 | |
| GB | 2279286 | 1/1995 | |
| GB | 2335882 A * | 10/1999 | ........... A23G 3/0263 |
| GB | 2405827 | 1/2007 | |
| JP | 55023911 | 2/1980 | |
| JP | 56023838 | 3/1981 | |
| JP | 59120062 | 7/1984 | |
| JP | 61037077 | 2/1986 | |
| JP | 2092261 | 4/1990 | |
| JP | 6303907 | 11/1994 | |
| JP | 2009136193 | 6/2009 | |
| RU | 2041640 | 8/1995 | |
| RU | 2185071 | 7/2002 | |
| RU | 2246223 | 2/2005 | |
| WO | 1993021087 | 10/1993 | |
| WO | 1994004046 | 3/1994 | |
| WO | 1995032633 | 12/1995 | |
| WO | 2001080660 | 11/2001 | |
| WO | 2003094626 | 11/2003 | |
| WO | 2003099031 | 12/2003 | |
| WO | 2004068963 | 8/2004 | |
| WO | WO2006122823 A1 * | 11/2006 | ............... A23G 1/00 |
| WO | 2009040530 | 4/2009 | |
| WO | 2012171657 | 12/2012 | |

OTHER PUBLICATIONS

Australian Patent Office, Office Action dated Jun. 3, 2014, from Australian Patent Application No. 2012279094, 5 pages.
Australian Patent Office, Office Action dated Jun. 3, 2014, from Australian Patent Application No. 2012279200, 4 pages.
Australian Patent Office, Office Action dated Jun. 4, 2014, from Australian Patent Application No. 2012279126, 4 pages.
Australian Patent Office, Office Action dated May 12, 2015, from Australian Patent Application No. 2012279126, 3 pages.
Australian Patent Office, Office Action dated May 6, 2015, from Australian Patent Application No. 2012279251, 3 pages.
Chinese Patent Office, Office Action and Search Report dated Apr. 1, 2016, from Chinese Patent Application No. 201280043422.6, 22 pages.
Chinese Patent Office, Office Action and Search Report dated Feb. 2, 2015, from Chinese Patent Application No. 201280043422.6, 26 pages.
Chinese Patent Office, Office Action and Search Report dated Feb. 5, 2015, from Chinese Patent Application No. 201280033501.9, 19 pages.
Chinese Patent Office, Office Action and Search Report dated Jan. 19, 2015, from Chinese Patent Application No. 201280043393.3, 18 pages.
Chinese Patent Office, Office Action and Search Report dated Nov. 2, 2015, from Chinese Patent Application No. 201280043422.6, 20 pages.

(56) References Cited

OTHER PUBLICATIONS

Chinese Patent Office, Office Action dated Dec. 16, 2015, from Chinese Patent Application No. 201280033501.9, 14 pages.
Chinese Patent Office, Office Action dated Feb. 2, 2015, from Chinese Patent Application No. 201280043380.6, 22 pages.
Chinese Patent Office, Office Action dated Jul. 5, 2016, from Chinese Patent Application No. 201280033501.9, 16 pages.
Chinese Patent Office, Office Action dated Oct. 23, 2015, from Chinese Patent Application No. 201280043380.6, 14 pages.
Electronics Cooling. Thermal Conductivity of Rubbers. Mar. 10, 2010, Retrieved from Internet Archive URL: <https://web.archive.org/web/20100315052438/http://www.electronics-cooling.com/2001/11/the-thermal-conductivity-of-rubbers-elastomers/>, 4 pages.
Europan Patent Office Search Report of European Applicatin No. 11172831, dated Feb. 1, 2012.
European Search Report and Written Opinion, European Application 11172832.5, dated Feb. 10, 2012, 9 pages.
European Search Report, European Patent Application No. 11172834.1, dated Feb. 16, 2012, 9 pages.
Extended European Search Report, European Application No. 11172831.7, dated Feb. 17, 2012, 11 pages.
International Search Report and Written Opinion, International Patent Application PCT/US2012/044857, dated Dec. 3, 2012, 10 pages.
International Search Report and Written Opinion, International Patent Application PCT/US2012/045196, date of completion Nov. 21, 2012, 13 pages.
International Search Report and Written Opinion, International Patent Application PCT/US2012/045219, date of completion Dec. 3, 2012, 22 pages.
International Search Report and Written Opinion, International Patent Application PCT/US2012/045360, date of completion Nov. 23, 2012, 16 pages.
Lasance, Clemens J.M. "The Thermal Conductivity of Rubbers/Elastomers." Engineering Toolbox, Feb. 4, 2009, Retrieved from Internet Archive URL: <https://web.archive.org/web/20090204033803/http://engineeringtoolbox.com/thermal-conductivity-d_429.html>, 2 pages.
New Zealand Patent Office, Office Action dated Jan. 6, 2016, from New Zealand Patent Application No. 619689, 2 pages.
New Zealand Patent Office, Office Action dated Nov. 6, 2014, from New Zealand Patent Application No. 619689, 2 pages.
New Zealand Patent Office, Office Action dated Nov. 7, 2014, from New Zealand Patent Application No. 619794, 2 pages.
New Zealand Patent Office, Office Action dated Oct. 2, 2014, from New Zealand Patent Application No. 619608, 2 pages.
New Zealand Patent Office, Office Action dated Oct. 2, 2014, from New Zealand Patent Application No. 619609, 2 pages.
Partial European Search Report, European Application 11172833.3, date of completion Mar. 2, 2012, 10 pages.
Russian Patent Office, Decision to Grant dated Jan. 25, 2017, from Russian Patent Application No. 2014103150, 14 pages.
Russian Patent Office, Office Action dated Apr. 11, 2016, from Russian Patent Application No. 2014102481, 7 pages.
Russian Patent Office, Office Action dated Apr. 11, 2016, from Russian Patent Application No. 2014102649, 7 pages.
Russian Patent Office, Office Action dated Aug. 15, 2016, from Russian Patent Application No. 2014103150, 6 pages.
Russian Patent Office, Office Action dated May 13, 2016, from Russian Patent Application No. 2014103313, 4 pages.

* cited by examiner

METHOD FOR MANUFACTURING AN AERATED CONFECTIONERY SHELL

CROSS REFERENCE TO RELATED APPLICATIONS

This application is a U.S. national phase application of International Application No. PCT/US2012/044857, filed Jun. 29, 2012, designating the United States, which claims benefit from EP Application No. 11172834.1, filed Jul. 6, 2011, both of which are hereby incorporated herein by reference in their entirety.

TECHNICAL FIELD

The present invention relates to a method for manufacturing an aerated confectionery shell. An aerated confectionery shell obtainable by the method is also provided.

BACKGROUND OF THE INVENTION

Aerated confections are widespread. The inclusion of gas bubbles in a confection provides unique textural properties (mouthfeel) and reduces the density of the confection. This has the advantage of reducing the calorie content of the confection as well as reducing production costs since less confectionery material (e.g. chocolate) is required.

A chocolate bar containing a bubble-filled central portion encased within a solid outer layer is known. The central portion is produced by mixing liquid chocolate with a gas (e.g. carbon dioxide or nitrogen) under an elevated pressure, depositing the aerated chocolate into a mould cavity and cooling the chocolate. Micro-bubbles in the chocolate expand once the chocolate is returned to atmospheric pressure. Cooling serves to preserve the bubbles. Subsequently, the aerated central portion is coated with an outer layer of chocolate by enrobing.

Confections comprising a shell and a filling are also commonplace. The shell provides structural rigidity as well as protecting the filling and/or preventing leakage of the filling. The shell is therefore typically formed from solidified chocolate. On the other hand, the filling may or may not be solidified. It is also possible to omit the filling, i.e. produce a hollow confection.

Confectionery shells are typically produced by depositing shell material into a mould cavity, vibrating the mould, allowing an outer layer of the material to solidify, and inverting and vibrating the mould to remove excess material (the so-called "inversion method"). The first vibration step is performed at a precise frequency and amplitude in order to remove air bubbles contained in the shell material. This prevents air bubbles breaking the surface of the shell, which could spoil the appearance of the shell and allow a filling to leak out of the finished confection.

As well as the inability to produce aerated shells of satisfactory quality, the inversion method suffers from the disadvantage that the excess material must be collected and treated (e.g. re-tempering of chocolate) to avoid wastage. Also, the shell typically does not have a uniform thickness, especially when using a shell material having a relatively high viscosity. This imposes restrictions on the composition (e.g. fat content) of the material. The method is also burdensome in that the deposited material must be cooled for long enough that part of it solidifies to form the shell, but not so long that too much of the material solidifies.

It is an object of the present invention to provide a method for manufacturing a confectionery shell which does not suffer from the disadvantages of the known methods.

SUMMARY OF THE INVENTION

A first embodiment of the present invention is a method for manufacturing an aerated confectionery shell comprising the steps of:
(i) aerating an edible liquid;
(ii) depositing the aerated edible liquid into a mould cavity; and
(iii) pressing the aerated edible liquid in the mould cavity using a stamp having a surface temperature below the solidification temperature of the edible liquid so as to shape and at least partially solidify the liquid, thereby forming an aerated shell layer;
wherein the aerated shell layer has a total gas content of at least 5%, the gas content being calculated using the following formula (1):

$$\text{Gas content of aerated shell layer} = (M2-M1)/M2$$

wherein $M1$ is the mass of the aerated shell layer having volume $V1$, and $M2$ is the mass of a non-aerated shell layer having volume $V1$ and being formed from the same edible liquid as the aerated shell layer and in the same manner as the aerated shell layer.

This method produces a confectionery shell having unique textural properties owing to the presence of gas bubbles therein. Aeration also reduces the mass of the shell (for a particular shell volume), thereby reducing its calorie content and the cost of producing the shell.

The method is also advantageous in that the "cold-stamping" step (ii) avoids significant de-aeration of the edible liquid. The method thus allows for precise control of the degree of aeration of the shell.

On a similar note, the cold-stamping step prevents expansion, coalescence and migration of gas bubbles within the edible liquid, thereby avoiding significant blistering and breakage of the surface of the shell layer, as would occur using the inversion method without vibration of the mould. The size of the gas bubbles in the shell layer can therefore be precisely controlled.

Cold-stamping is also advantageous compared to the inversion method in that it can be used to produce a shell having a uniform thickness and does not produce as much excess material as the inversion method. Furthermore, cold-stamping is not as dependent on the viscosity of the shell material, so the material can be varied more freely.

A second embodiment of the present invention is an aerated confectionery shell obtainable by a method as defined above. The confectionery shell is advantageous for the reasons mentioned with respect to the method; that is, the shell has a unique texture, a lowered calorie content and little surface blistering/breakage.

DETAILED DESCRIPTION OF THE INVENTION

Figure 1:
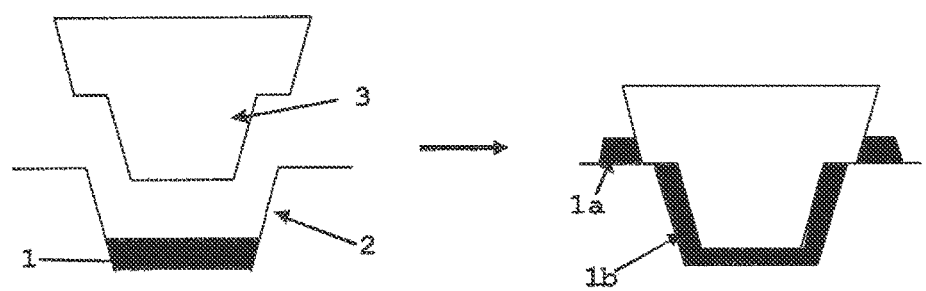
FIG. 1: Illustration of cold-stamping.

The method of the first embodiment of the present invention is described in detail below.

The method produces an aerated confectionery shell. The shell can, for instance, be a shell for a praline, a tablet or a countline. The shell may contain the aerated shell layer only or may be a multi-layered shell containing other layers besides the aerated shell layer.

"Liquid" in the context of the present invention means flowable, i.e. unsolidified to such an extent that the material flows under gravity or an applied force. The liquid can have a range of viscosities, provided that it is capable of being deposited into the mould cavity using a conventional depositor and is capable of shaped and solidified using a conventional cold-stamping apparatus.

It is not necessary for the edible liquid to contain 100% of a liquid phase; the liquid may contain solid components (e.g. cocoa solids). "Liquid" therefore covers pastes, gels, suspensions and emulsions.

The edible liquid is not particularly limited. The edible liquid is liquid chocolate in one embodiment. "Chocolate" includes plain, dark, milk, white and compound chocolate.

"Aerate" in the context of the present invention means to incorporate a gas into the edible liquid. The edible liquid may be aerated by mixing the edible liquid with a gas under elevated pressure (greater than atmospheric pressure). This can be achieved using commercially-available aeration apparatuses, e.g. a Sollich Turbotemper® airo apparatus. The pressure inside the apparatus is suitably 4-6 bar. A pressure within this range provides intimate mixing of the edible liquid and the gas.

The gas for aeration is not limited to air; the gas can be any gas conventionally used to aerate confectionery materials. In one embodiment, the gas used to aerate the edible liquid comprises at least one of carbon dioxide, nitrogen and nitrous oxide. These gases are non-toxic, largely tasteless and allow for controlled aeration. Carbon dioxide also dissolves well in fat and so is less prone to escape from liquids containing a fat phase (e.g. chocolate) during cold-stamping than less fat-soluble gases such as nitrogen. Nitrogen is merely dispersed in the liquid.

Some gases can have a detrimental effect on the liquid; for instance, oxygen may cause fats in the liquid to turn rancid. Accordingly, in one embodiment, the gas comprises at least 95 mass % of carbon dioxide, nitrogen, nitrous oxide or a mixture thereof.

The aerated edible liquid to be deposited into the mould cavity in step (ii) suitably has a total gas content of at least 5%, the gas content being calculated using the following formula (2):

$$\text{Gas content of aerated edible liquid} = (M4-M3)/M4$$

wherein M3 is the mass of the aerated edible liquid having volume V2, and M4 is the mass of the same volume of the edible liquid without aeration. This means that the mass of the edible liquid per unit volume (V2) is reduced by at least 5% upon aerating the liquid.

A gas content of at least 5% is advantageous in terms of providing a good texture and reducing the calorie content of the shell. In this regard, the gas content of the aerated edible liquid can be at least 10%, at least 15%, at least 20%, at least 25%, at least 30% or at least 40%, and in some embodiments the gas content is within the range 5-40%, 5-25% or 10-20 mass % so that there is not an excessive loss of gas from the liquid during cold-stamping. A higher initial gas content leads to a greater degree of de-aeration relative to the initial gas content. This is because the gas bubbles have a greater chance of coalescing to form larger bubbles. Large bubbles quickly escape from the liquid due to the large difference between their densities and the density of the liquid.

Another measure of the degree of aeration of the liquid is the volume of gas in the liquid with respect to the total volume of the liquid. In one embodiment, the liquid contains no more than 14 vol %, no more than 18 vol % or no more than 22 vol % of gas. A suitable minimum gas content is 10 vol %. A gas content of 10-22 vol % is advantageous in terms of taste and mouthfeel.

The aerated liquid can have a density or no more than 1.10 $g/cm^3$, no more than 1.05 $g/cm^3$, no more than 1.00 $g/cm^3$, or no more than 0.95 $g/cm^3$. A density within the range of 0.98-1.1.0 $g/cm^3$ is optimal in terms of taste and mouthfeel.

The edible liquid can be treated prior to aeration to ensure that it has adequate flow properties for deposition and cold-stamping, and to ensure that it has optimum solidification properties. Chocolate can be tempered using a conventional method so that it contains stable crystals. This causes the chocolate to contract slightly upon contact with the stamp, which allows the stamp to be withdrawn without the shell layer adhering to it.

The mould cavity may be one of a plurality of cavities in a mould. For instance, the mould may be a tray mould consisting of one or more lanes of cavities, the cavities also being arranged into rows (e.g. 2-6 rows). The size and shape of the cavity depends on the type of shell to be produced. A cavity having a substantially uniform inner surface which corresponds to the shape of the portion of the stamp to be immersed into the cavity allows a shell having a uniform thickness to be produced.

The mould cavity may contain sub-cavities. For instance, the cavity may be for producing confections in tablet form, the tablet having blocks which can be broken into manageable pieces.

The edible liquid can be deposited into the mould cavity manually or using a conventional depositor such as a multi-nozzled depositor, which deposits liquid into multiple (sub-) cavities simultaneously. Following deposition, the liquid may be subjected to some degree of vibration in order to form an even liquid layer at the base of the cavity. However, the vibration should not cause appreciable de-aeration of the liquid. The frequency and amplitude of vibration should be selected accordingly.

In one embodiment, the edible liquid is deposited directly onto the base of the mould cavity. In this way, the aerated shell layer formed from the liquid is the outermost shell layer in the mould cavity. Despite the contact between the cavity and the aerated liquid, significant de-aeration of the liquid is avoided by the use of cold-stamping. There is also little or no blistering/breakage of the outer surface of the aerated shell layer. Accordingly, the aerated shell layer may form the outermost layer of the confectionery shell, i.e. no further layers need be formed on the outside of the aerated shell layer. Alternatively, one or more further layers may be formed on the outside of the aerated shell layer after de-moulding the aerated layer; for instance, the outer surface of the aerated shell layer may be covered with chocolate or dusted with a sugar coating. The further layer(s) may partially or fully enclose the aerated shell layer.

It is also possible to form one or more further shell layers on the inside of the aerated shall layer, either before or after de-moulding the aerated layer. The further layers may or may not be aerated.

In an alternative embodiment, the aerated edible liquid is deposited onto a pre-formed shell layer (e.g. a chocolate layer) in the mould cavity. The pre-formed layer may be unaerated so that it forms a solid outer layer in the cavity. In this case, it is acceptable that the aerated shell layer has a non-uniform surface since it can be hidden beneath the outer layer.

Once the edible liquid has been deposited into the mould cavity, it is pressed using a stamp. The timing of this step is dependent on the level of aeration of the liquid and the desired bubble size within the stamped shell layer. When the edible liquid has been aerated by mixing the liquid with a gas under an elevated pressure, micro-bubbles are formed in the liquid. These micro-bubbles expand once the pressure is lowered. The liquid should therefore be stamped once the bubbles have reached the desired size. The rate and extent of expansion is dependent upon the type of gas and the difference between the mixing pressure and the pressure during and after deposition of the liquid.

The liquid may be stamped within 60 seconds, 45 seconds or 30 seconds of the end of the deposition step. Stamping within 10 seconds of deposition prevents over-expansion of the gas bubbles, which can lead to excessive surface blistering and breakage as well as degradation of textural properties.

A conventional cold-stamping apparatus may be employed to shape and solidify the edible liquid. Such an apparatus comprises one or more stamps having a pressing surface. The stamp(s) are usually made from a metal such as steel or aluminium. The apparatus also comprises a means for cooling the stamp(s). Cooling is typically achieved by circulating a cooling liquid around the stamp(s), the cooling liquid being at a temperature less than the desired temperature of the pressing surface of the stamp(s).

The stamp is immersed into at least part of the aerated edible liquid in the mould cavity, the immersed surface of the stamp having a temperature below the solidification temperature of the liquid. This ensures that the liquid is at least partially solidified by the stamp. Specifically, the liquid in contact with the stamp is solidified to form an inner "skin" which acts to prevent de-aeration, maintain the shape of the shell when the stamp is withdrawn and provide a barrier to material subsequently filled into the shell. It is therefore not essential that the liquid is fully solidified during the pressing step; the liquid can be fully solidified after the pressing step by cooling the entire mould. However, substantial solidification throughout the liquid during cold-stamping prevents expansion, migration and coalescence of gas bubbles. This is achieved by adjusting the temperature and immersion period of the stamp as appropriate.

The cold-stamping step is illustrated in FIG. 1. In this example, a stamp (3) is immersed into an aerated edible liquid (1) deposited in a mould cavity (2). The stamp forces the edible liquid up the sides of the cavity and a portion of the liquid (1a) is allowed to run out of the cavity. This portion is disconnected from the partially solidified liquid (1b) in the cavity once the stamp is in its fully immersed position. The disconnected portion can be removed once the stamp has been withdrawn, e.g. by passing a scraping means across the surface of the mould.

The surface temperature of the stamp is dependent upon the solidification temperature of the edible liquid. The stamp can have a surface temperature of 0° C. or less, −5° C. or less, −10° C. or less, or −15° C. or less in order to cool and solidify the liquid sufficiently quickly that gas bubbles do not migrate or expand to any appreciable extent. A surface temperature within the range of −5° C. to −25° C. prevents de-aeration and blistering/breakage of the surface of the shell layer.

The immersion period is typically less than 10 seconds, but can vary depending on the temperature of the stamp, the thickness of the shell layer and the composition of the edible liquid. An immersion period of 2-10 seconds is optimal.

In one embodiment, the surface temperature of the stamp is −5° C. or less and the immersion period is 2-10 seconds, the surface temperature of the stamp is −10° C. or less and the immersion period is 1-5 seconds, or the surface temperature of the stamp is −15° C. or less and the immersion period is 0.5-3 seconds.

The stamp can be immersed into the edible liquid at a speed of 20-60 mm/s in order to avoid gas losses between deposition and stamping. A speed within this range is desirable when the gas is nitrogen since de-aeration of nitrogen can be rapid (nitrogen has a low solubility in fat).

In general, cold-stamping avoids significant de-aeration of the edible liquid since the liquid is rapidly cooled by the stamp so that it is at least partially solidified before gas bubbles escape.

The aerated shell layer produced by cold-stamping has a total gas content of at least 5%, the gas content being calculated using the following formula (1):

$$\text{Gas content of aerated shell layer} = (M2-M1)/M2$$

wherein M1 is the mass of the aerated shell layer having volume V1, and M2 is the mass of a non-aerated shell layer having volume V1 and being formed from the same edible liquid as the aerated shell layer and in the same manner as the aerated shell layer. This means that the mass of the aerated shell layer is at least 5% less than the mass of an equivalent shell layer which has not been aerated.

In one embodiment, the aerated shell layer has a gas content of 5-40% or 10-25% from the viewpoint of providing optimum sensorial characteristics, particularly mouthfeel. Too high a degree of aeration produces a shell layer having little impact in terms of taste and mouthfeel. A shell layer having a high level of aeration is also fragile and will inevitably have a non-uniform surface due to gas bubbles at the surface.

Like the aerated liquid, the aerated shell layer can have a vol % gas content of no more than 14 vol %, no more than 18 vol % or no more than 22 vol %, and a suitable minimum gas content is 10 vol %. A gas content of 10-22 vol % provides optimal taste and mouthfeel.

The density of the aerated shell layer is suitably no more than 1.10 g/cm$^3$, no more than 1.05 g/cm$^3$, no more than 1.00 g/cm$^3$, or no more than 0.95 g/cm$^3$. A density within the range of 0.98-1.10 g/cm$^3$ is optimal in terms of taste and mouthfeel.

The aerated shell layer can have a minimum thickness of 1.0 mm (i.e. no part of the layer has a thickness less than 1.0 mm), 1.2 mm or 1.5 mm in order to avoid de-aeration. It is thought that this is due to a reduction in the sheer force applied to the layer by the stamp as compared to a thinner layer.

The maximum thickness of the aerated shell layer can be 5.0 mm, 4.0 mm, 3.0 mm or 2.0 mm so that the shell does not dominate the taste and texture of a confection formed from the shell. In any case, it is not usually desirable to produce an aerated shell layer having a thickness greater than 5.0 mm in view of the time required to solidify the shell.

The minimum and maximum thickness values disclosed above can be freely combined. Advantageous thickness ranges are 1.0-5.0 mm, 1.2-4.0 mm and 1.5-3.0 mm. For each range, the thickness of the aerated shell layer does not fall outside the range at any point.

The gas bubbles in the aerated shell layer can have a diameter of no more than 2.0 mm, no more than 1.5 mm, or no more than 1.0 mm. There is less risk of the layer surface collapsing when it contains relatively small gas bubbles. Small bubbles are also distributed more evenly in the shell layer and are less likely to coalesce.

The aerated shell layer may be de-moulded following stamping (and optionally further cooling). On the other hand, further steps may be performed before de-moulding. For instance, a further shell layer (e.g. a non-aerated chocolate layer or a moisture barrier layer) may be formed on the aerated layer by cold-stamping or another method. Alternatively, or additionally, the shell may be filled to produce a confection. Examples of the filling material include chocolate, cream, caramel, toffee, alcohol, fruit and combinations thereof. A finishing (base) layer can be formed on the filling to fully enclose the filling.

A moisture barrier layer may be used to prevent moisture transfer from the confection to the environment or to moisture-sensitive components (e.g. chocolate), especially if the shell is to be filled with a component having a high water activity (e.g. a fresh fruit composition). The moisture barrier composition can be any conventional moisture barrier composition such as a fat-based moisture barrier composition or a heterogeneous moisture barrier composition, both of which contain crystalline fats.

Figure 2:
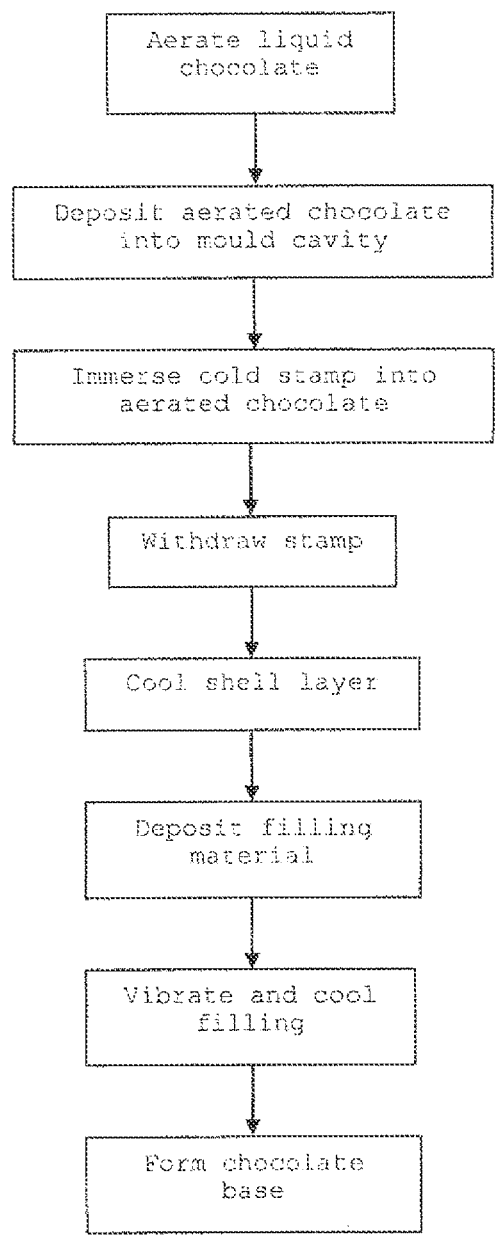
FIG. 2: Flow diagram illustrating a method according to the present invention.

FIG. 2 illustrates a particular method for producing a confection according to the present invention. The method involves the initial step of aerating liquid chocolate. The aerated chocolate is deposited into a mould cavity and is subjected to cold-stamping to form an aerated shell. After the stamp is withdrawn, the mould is cooled to fully solidify the shell. A filling material is then deposited into the shell, and the filling material is vibrated to provide an even surface. After cooling the filling, a chocolate base is formed over the filling so that the filling is fully enclosed. This typically includes vibration and cooling of a liquid chocolate layer deposited over the filling. Finally, the confection is de-moulded.

The confectionery shell produced by the method of the present invention comprises a shell layer which contains gas bubbles as a consequence of the aeration step and subsequent cold-stamping step. Cold-stamping preserves the bubbles in the edible liquid before the liquid undergoes significant de-aeration. The gas content of the shell layer is at least 5%, as disclosed above with respect to the method of manufacture. Particular features of the shell layer (e.g. gas content, density, thickness, bubble diameter) are also as disclosed above.

The confectionery shell may contain additional layers besides the aerated shell layer. As disclosed above, the shell may contain a non-aerated layer on the outside, inside or both sides of the aerated layer.

EXAMPLES

The present invention is illustrated by the following Examples.

Reference Example 1

352 g of Milka® milk chocolate having a density of 1.22 g/cm$^3$ (manufactured by Kraft Foods) was tempered using a Sollich Turbotemper® Airo (model TT100B) apparatus (without aeration). 55 g of the tempered chocolate was manually deposited into a cavity of a mould pre-warmed to 30° C., and the mould was vibrated using a Knobel VT DUO/H vibration table for 30 seconds (x-frequency=100 Hz, y-frequency=100 Hz, amplitude=3 mm) in order to even the surface of the liquid chocolate in the cavity.

The liquid chocolate was pressed in the cavity using a Knobel Cold Press® unit (model 07-KCM-09) equipped with a stamp. The surface of the stamp immersed into the chocolate had a temperature of −3° C., the speed of the stamp between its starting position (X-position) and final position (Y-position) in the chocolate was 40 mm/s, and the immersion period was 7 seconds. The thus-formed aerated shell had a uniform thickness of 1.1 mm.

The mould was stored at 25° C. for 5 minutes and excess chocolate extending outside the cavity was scraped off the mould surface using a knife. The mould was then stored at 10° C. for 30 minutes and the shell was removed from the cavity.

The shell had a mass of 35.6 g and a density of 1.22 g/cm$^3$.

Reference Examples 2 and 3

Shells were produced in the same manner as the shell of Reference Example 1, except that the thicknesses of the shells were altered, as shown in Table 1 below.

Example 1

A shell was produced in the same manner as the shell of Reference Example 1, except that 293 g of the chocolate was both tempered and aerated using the Sollich Turbotemper® Airo apparatus prior to deposition, and the mould was not vibrated. The gas for aeration was carbon dioxide, the initial amount of gas injected into the liquid chocolate (gas temper) was 20%, and the counter-pressure was 5 bar.

The aerated chocolate had the same volume as the non-aerated chocolate deposited in Reference Example 1. The gas content of the aerated chocolate was therefore calculated to be 17% using the above formula (2) $\{(352-293)/352\}\times 100$]. The density was 1.01 g/cm$^3$.

50 g of the aerated chocolate was deposited into the mould cavity and subjected to cold-stamping.

Like the shell of Reference Example 1, the aerated shell had a thickness of 1.1 mm. However, the aerated shell had a mass of 31.1 g. The gas content of the shell was therefore calculated to be 13% using the above formula (1) $\{(35.6-31.1)/35.6\}\times 100$]. This equates to a 'gas loss' of 4%. The density of the shell was 1.06 g/cm$^3$ Examples 2-10

Aerated shells were produced in the same manner as the shell of Example 1, except that certain features of the method and shell were altered, as shown in Table 1 below.

Examples 11-18

Aerated shells were produced in the same manner as the shell of Example 1, except that the gas was changed to nitrogen and certain features of the method and shell were altered, as shown in Table 1 below.

TABLE 1

| | | Aeration of liquid chocolate | | | | Cold-stamping | | | | Aerated shell | | | |
|---|---|---|---|---|---|---|---|---|---|---|---|---|---|
| Example | Gas | Gas temper (%) | Counter-pressure (bar) | Mass of chocolate (g) | Gas content (%) | Mass deposited (g) | Stamp temp. (° C.) | Stamp speed (mm/s) | Stamp period (s) | Mass (g) | Thickness (mm) | Gas content (%) | Gas loss (%) |
| Ref. Ex. 1 | — | 0 | 2 | 352 | 0 | 55 | −3 | 40 | 7 | 35.6 | 1.1 | 0 | 0 |
| Ref. Ex. 2 | — | 0 | 5 | 352 | 0 | 55 | −3.1 | 40 | 7 | 29.6 | 1.6 | 0 | 0 |
| Ref. Ex. 3 | — | 0 | 5 | 352 | 0 | 60 | −3.1 | 40 | 7 | 45.5 | 2.0 | 0 | 0 |
| Ex. 1 | $CO_2$ | 20 | 5 | 293 | 17 | 50 | −3.0 | 40 | 7 | 31.1 | 1.1 | 13 | 4 |
| Ex. 2 | $CO_2$ | 40 | 5 | 223 | 37 | 50 | −3.0 | 40 | 7 | 30.2 | 1.1 | 15 | 22 |
| Ex. 3 | $CO_2$ | 15 | 5 | 331 | 6 | 50 | −3.0 | 40 | 7 | 33.5 | 1.1 | 6 | 0 |
| Ex. 4 | $CO_2$ | 25 | 5 | 293 | 17 | 50 | −3.0 | 40 | 2 | 31.8 | 1.1 | 12 | 5 |
| Ex. 5 | $CO_2$ | 25 | 5 | 295 | 16 | 50 | −3.0 | 80 | 7 | 31.1 | 1.1 | 13 | 4 |
| Ex. 6 | $CO_2$ | 25 | 5 | 294 | 16 | 55 | −3.0 | 40 | 7 | 33.9 | 1.6 | 14 | 2 |
| Ex. 7 | $CO_2$ | 25 | 5 | 295 | 16 | 60 | −3.0 | 40 | 7 | 38.7 | 2.0 | 15 | 1 |
| Ex. 8 | $CO_2$ | 25 | 5 | 293 | 17 | 50 | −9.0 | 40 | 7 | 30.8 | 1.1 | 13 | 3 |
| Ex. 9 | $CO_2$ | 25 | 5 | 290 | 18 | 55 | −9.0 | 40 | 7 | 32.3 | 1.6 | 18 | 0 |
| Ex. 10 | $CO_2$ | 25 | 5 | 301 | 14 | 50 | 2.1 | 40 | 7 | 32.7 | 1.1 | 8 | 6 |
| Ex. 11 | $N_2$ | 15 | 5 | 274 | 22 | 50 | −3.0 | 40 | 7 | 31.6 | 1.1 | 11 | 11 |
| Ex. 12 | $N_2$ | 3 | 3 | 302 | 14 | 50 | −3.0 | 40 | 7 | 31.9 | 1.1 | 10 | 4 |
| Ex. 13 | $N_2$ | 10 | 5 | 274 | 22 | 50 | −3.0 | 40 | 2 | 31.5 | 1.1 | 12 | 11 |
| Ex. 14 | $N_2$ | 10 | 5 | 272 | 23 | 50 | −3.1 | 80 | 7 | 30.8 | 1.1 | 13 | 9 |
| Ex. 15 | $N_2$ | 10 | 5 | 274 | 22 | 55 | −3.1 | 40 | 7 | 33.9 | 1.6 | 14 | 8 |
| Ex. 16 | $N_2$ | 10 | 5 | 273 | 22 | 60 | −3.1 | 40 | 7 | 38.3 | 2.0 | 16 | 7 |
| Ex. 17 | $N_2$ | 10 | 5 | 271 | 23 | 50 | −8.7 | 40 | 7 | 29.9 | 1.1 | 16 | 7 |
| Ex. 18 | $N_2$ | 12 | 5 | 271 | 23 | 50 | 2.1 | 40 | 7 | 32 | 1.1 | 10 | 13 |

The shells of Examples 1-18 had acceptably uniform surface profiles and contained no through-holes caused by gas bubbles. The shells of Examples 1-18 also had comparable tastes to the shells of the Reference Examples, though the aerated shells had a lower melting temperature, thereby providing a unique and pleasant mouthfeel.

It is evident from the results of the Examples that the method of the present invention produces a shell having an appreciable level of aeration and which does not have a significantly reduced gas content compared to the liquid from which it was formed. Reduced gas losses can be achieved by adjusting the gas content of the stamped liquid (see Examples 1-3, 11 and 12), adjusting the stamping period (see Examples 11 and 13), adjusting the thickness of the shell (see Examples 6, 7, 9, 15 and 16) and adjusting the surface temperature of the stamp (see Examples 1, 6, 8-11, 17 and 18).

By comparison, shells produced using a conventional inversion method have a gas content of no more than 3% due to the vibration step used to remove excess material from the mould cavity.

The invention claimed is:

1. A method for producing an aerated confectionery shell comprising the steps of:
   (i) aerating liquid chocolate;
   (ii) depositing the aerated liquid chocolate into a mould cavity; and
   (iii) pressing the aerated liquid chocolate in the mould cavity using a stamp having a surface temperature below the solidification temperature of the liquid chocolate so as to shape and at least partially solidify the liquid, thereby forming an aerated shell layer;
   wherein the aerated shell layer has a total gas content of at least 5% after being pressed and at least partially solidified, the gas content being calculated using the following formula (1):

Gas content of aerated shell layer=$[(M2-M1)/M2]*100\%$ wherein M1 is the mass of the aerated shell layer having volume V1, and M2 is the mass of a non-aerated shell layer having volume V1 and being formed from the same liquid chocolate as the aerated shell layer and in the same manner as the aerated shell layer, and;
   wherein the aerated shell layer is an outermost layer of the confectionery shell.

2. The method according to claim 1, wherein the step (i) of aerating the liquid chocolate comprises mixing the edible liquid with a gas under a pressure of 4-6 bar.

3. The method according to claim 1, wherein the aerated liquid chocolate deposited in step (ii) has a total gas content of at least 5%, the gas content being calculated using the following formula (2):

Gas content of aerated liquid chocolate =$[(M4-M3)/M4]*100\%$ wherein M3 is the mass of the aerated liquid chocolate having volume V2, and M4 is the mass of the same volume of the liquid chocolate without aeration.

4. The method according to claim 3, wherein the aerated liquid chocolate deposited in step (ii) has a total gas content of 5-25%.

5. The method according to claim 1, wherein the gas used for aeration of the liquid chocolate in step (i) comprises at least 95 mass % of carbon dioxide, nitrogen, nitrous oxide or a mixture thereof.

6. The method according to claim 1, wherein the aerated liquid chocolate is deposited directly onto a base of the mould cavity in step (ii).

7. The method according to claim 1, wherein the surface temperature of the stamp in step (iii) is −5° C. or less.

8. The method according to claim 1, wherein the aerated shell layer has a total gas content of 10-25%.

9. The method according to claim 1, wherein the aerated shell layer has a density of 0.98-1.10 g/cm³.

10. The method according to claim 1, wherein the aerated shell layer has a minimum thickness of 1.0 mm and a maximum thickness of 5.0 mm.

11. The method according to claim 1, wherein the aerated shell layer contains gas bubbles having a maximum diameter of 1 mm.

12. An aerated confectionery shell obtainable by the method according to claim 1.

13. The method according to claim 1, wherein the pressing step comprises immersing the stamp at a speed of 20-60 mm/s.

14. The method according to claim 13, wherein the stamp has a surface temperature between −5° C. and −25° C.

15. The method according to claim 14, wherein the stamp has a surface temperature of about −5° C. or less, and the immersion period is between about 2 and about 10 seconds.

16. The method according to claim 14, wherein the stamp has a surface temperature of about −10° C. or less, and the immersion period is between about 1 and about 5 seconds.

17. The method according to claim 14, wherein the gas content of the aerated edible liquid is at least 95% nitrogen by mass and the stamp has a surface temperature of about −15° C. or less, and the immersion period is between about 0.5 and about 3 seconds.

18. A method for producing an aerated confectionery shell comprising the steps of:
 (i) aerating liquid chocolate to form an aerated liquid chocolate having a density of 0.98-1.10 g/cm$^3$;
 (ii) depositing the aerated liquid chocolate into a mould cavity; and
 (iii) pressing the aerated liquid chocolate in the mould cavity using a stamp having a surface temperature between −5° C. and −25° C. for a period between about 2 and about 10 seconds to solidify the aerated liquid, thereby forming an aerated shell layer;
wherein the aerated shell layer has a density of 0.98-1.10 g/cm$^3$ and a total gas content of 10-22% after being pressed and at least partially solidified, the gas content being calculated using the following formula (1):

$$\text{Gas content of aerated shell layer} = [(M2-M1)/M2]*100\%$$

wherein M1 is the mass of the aerated shell layer having volume V1, and M2 is the mass of a non-aerated shell layer having volume V1 and being formed from the same liquid chocolate as the aerated shell layer and in the same manner as the aerated shell layer, and;
wherein the aerated shell layer is an outermost layer of the confectionery shell.

19. The method according to claim 18, wherein the gas used for aeration of the liquid chocolate in step (i) comprises at least 95 mass % of carbon dioxide, nitrogen, nitrous oxide or a mixture thereof.

20. The method according to claim 19, wherein the pressing step comprises immersing the stamp at a speed of 20-60 mm/s.

* * * * *